(12) United States Patent
Legge

(10) Patent No.: US 6,204,473 B1
(45) Date of Patent: Mar. 20, 2001

(54) LASER-EQUIPPED MACHINE TOOL CUTTING HEAD WITH PRESSURIZED COUNTERBALANCE

(75) Inventor: John C. Legge, Rockford, IL (US)

(73) Assignee: W.A. Whitney Co., Rockford, IL (US)

( * ) Notice: Subject to any disclaimer, the term of this patent is extended or adjusted under 35 U.S.C. 154(b) by 0 days.

(21) Appl. No.: 09/302,279

(22) Filed: Apr. 30, 1999

(51) Int. Cl.[7] .................................................. B23K 26/14
(52) U.S. Cl. .................................. 219/121.67; 219/121.84
(58) Field of Search ........................... 219/121.84, 121.67, 219/121.72

(56) References Cited

U.S. PATENT DOCUMENTS

| | | | |
|---|---|---|---|
| 5,332,881 | * | 7/1994 | Topkaya et al. ................ 219/121.84 |
| 5,607,606 | * | 3/1997 | Mori et al. ...................... 219/121.75 |
| 6,124,565 | * | 9/2000 | Morishita et al. .............. 219/121.67 |

FOREIGN PATENT DOCUMENTS 62-93095 * 4/1987 (JP) .................................. 219/121.75

* cited by examiner

*Primary Examiner*—Geoffrey S. Evans
(74) *Attorney, Agent, or Firm*—Leydig, Voit & Mayer, Ltd.

(57) ABSTRACT

A cutting head for a laser-equipped machine tool in which the cutting head has a controllably positionable optic carrier for adjusting the position of the beam focus. The focusing optic has a reaction force imposed on it by the assist gas coupled to the cutting nozzle. The magnitude of the force varies with the pressure of the assist gas, and can be very substantial. A counterbalance mechanism connected between the cutting head and the optic carrier is operated from the same assist gas source which supplies the nozzle, and creates a force on the optic in the opposite direction of the reaction force and which has a magnitude which closely compensates it. The system also provides for rapid purge of assist gas when switching from one type of assist gas to another.

15 Claims, 10 Drawing Sheets

LASER-EQUIPPED MACHINE TOOL CUTTING HEAD WITH PRESSURIZED COUNTERBALANCE

FIELD OF THE INVENTION

The present invention generally relates to machine tools, and more particularly relates to machine tools using lasers for cutting metal and other materials.

BACKGROUND OF THE INVENTION

Many shapes and objects are formed from sheet or plate stock with a variety of different types of machine tools. For example, punch presses can be used for repeatedly forming identical shapes and objects in sheet metal and relatively thin plate. With a punch press, dies corresponding to the shape of the pattern to be formed are directed against the sheet stock such that the desired object or pattern is formed in the material and removed therefrom when the dies retract. Such punch presses are shown, for example, in U.S. Pat. Nos. 3,800,643 and 4,030,391, both assigned to the present assignee.

A high temperature torch can be used to melt the material and cut a shape in or a part from the sheet or plate. One such torch operates by ionizing a column of gas with an electric arc to produce temperatures up to 30,000° F. A high velocity, high temperature plasma stream and electric arc strike the workpiece with the heat serving to instantly melt the material, and the high velocity stream carrying the removed material, or slag, away. Such plasma torch machine tools are disclosed in U.S. Pat. Nos. 4,063,059 and 5,763,852, both assigned to the present assignee.

In still further types of machine tools, a laser beam is employed for melting the material and forming the cut. With a typical laser-equipped machine tool, a laser beam is directed through a focusing lens or optic to direct the focal point of the laser beam above, on or below the surface of the material to be cut. The laser beam is directed from the focusing optic through a nozzle positioned immediately above the workpiece, and a pressurized gas is directed through the nozzle, typically coaxially with the laser beam, to assist making the cut. The pressurized gas interacts with the laser beam and material, to facilitate the cutting process, and creates a gas stream which carries the removed material away from the cut. It is advantageous to use gas pressures of several hundred pounds per square inch to cut some types of material such as stainless steel.

When using a laser-equipped cutting machine tool it is advantageous that means be provided to control the position of the nozzle at a variable preset distance above the surface of the material to be cut. A means commonly used is a system wherein a cutting head includes a manually adjustable ring surrounding the cutting nozzle. The ring includes a number of downward pointing ball bearings projecting a small distance from the ring. To cut, the cutting head is lowered until the ball bearings contact the material. The ball bearings then ride on the surface of the material supporting the cutting head and maintaining the position of the nozzle at the preset distance above the material. An advantage of such a system is that it will work for cutting nonmetallic materials. A disadvantage is the larger outside diameter of the cutting head increases the chance of interfering with and colliding with previously cut parts which may tip on the supporting surface extending an edge above the surface of the sheet. Such a system is also prone to causing scratches in the surface of the material which may cause problems when the final finish is applied to the part.

Another known means is to provide a servo axis to move and position the nozzle above the material to be cut, and to equip the cutting head such that the nozzle is used as an element of a capacitivie sensor system. Such a system is non-contact and thus will not scratch the sheet. Such a system can be made with a small outside diameter minimizing the possibility of interfering with previously cut, tipped up parts. Such a system has a disadvantage in that it will not work for cutting nonmetallic materials.

Another commonly used means is to provide a servo axis to move and position the nozzle above the material to be cut, and to equip the cutting head with a foot which interacts with a feedback means to the servo. Such a system has the advantage that it will work with metallic and nonmetallic materials. Such a system has the disadvantages that it may scratch the sheet. It is also larger than a capacitive sensor system and more likely to collide with previously cut, tipped up parts and be damaged thereby.

When using laser-equipped cutting machine tools it is advantageous to utilize optics with different focal lengths to cut various thicknesses of material. The focal length of the optic contributes to the diameter of the focal spot and thus the energy density, watts per square unit of area, at the focal spot. Shorter focal length optics create smaller focal spots having higher energy densities. The focal length of the optic also contributes to depth of focus of the focal spot, with longer focal lengths having greater depth of focus. Shorter focal length optics are advantageous for cutting thinner materials, while longer focal length optics are advantageous for cutting thicker material. Providing means to use optics with different focal lengths extends the range of material thicknesses which can be cut under optimum conditions.

A known apparatus for accomplishing such objectives is to provide a cutting head with multiple positions or slots in which focusing optics can be placed. Focal optics are commonly available in more or less standard focal lengths 2.5", 3,75", 5", 7.5", 10", 12.5", etc. For example, if it has been determined that a laser-equipped cutting machine is to cut a range of material thicknesses which can best be cut with focal lengths between 2.5" and 5", a cutting head might be supplied which has three slots; one for a 2.5" focal length lens, one for a 3.75" focal length lens, and one for a 5" focal length lens. The lenses would be mounted in a holder which is in turn adapted to fit in a slot in the cutting head. Multiple lens holders can be supplied providing the ability to quickly change form one focal length lens to another. Only one focal length lens is used in the cutting head at any one time. The other unused lens slots are filled with blank holders which serve only to seal the laser beam path in the cutting head.

When using a laser-equipped cutting machine tool it is also advantageous that the focusing optic be independently adjustable in position relative to the material being cut while the position of the cutting nozzle is maintained at a fixed distance above the surface of the material. The optimum position of the focal spot above the surface, on the surface, or below the surface of the material, changes with the type and thickness of material cut, and during piercing cycles.

It is also advantages during piercing of thick materials to change the position of the focusing optic relative to the surface of the material. Lowering the focusing optic while piecing drives the laser beam focal spot into the material hastening the piercing process.

One approach for changing the position of the focusing optic is to adapt the cutting head for vertical movement of the focusing lens holder and lens carrier. The lens carrier is adapted to move vertically and is guided by ways or bearings on round rods. An air cylinder or a translation screw, driven by a servo or stepper motor, is adapted to position the lens carrier upon command from the machine control.

Problems are encountered when adapting a cutting head having a vertical moving lens and/or lens carrier for use with high pressure cutting assist gas. The high-pressure gas is usually introduced into a chamber which is closed at the upper end by the focusing lens and at the lower end by the cutting nozzle. The gas pushes up against the lens and lens holder with a force "F" equal to the gas pressure in units of force per square unit of area times total square unit area of the lens and lens holder. This force can be substantial. The lens driving mechanism must be sized to resist this force. This leads to larger sized translation screws, motors and cylinders which are detrimental to designing a lightweight system which is advantageous in fast moving, high performance machines. Further, if a single translation screw or cylinder is used to drive the lens, the resultant force is an off center load between the lens and the screw, which complicates providing adequate guidance to the lens to prevent it from deflecting or canting out of square relative to the laser beam.

On laser-equipped machine tools it is also advantageous to use different types of cutting assist gasses. For example nitrogen may be most advantageous for use in cutting one type of material, with oxygen being the best alternative for another. All known lasers have cutting heads including a nozzle through which the laser beam and pressurized gas pass, and the orifice of the nozzle is relatively small. When the type of pressurized gas is to be changed, the previous gas must first be purged from the cutting head gas chamber through the small diameter nozzle orifice. The small diameter of the orifice can make the purging process quite slow. If the gas is not adequately purged, the quality of the cut may suffer for a time until the old assist gas is adequately purged during cutting.

SUMMARY OF THE INVENTION

In view of the foregoing, it is a general aim of the present invention to provide a cutting head for a laser-equipped machine tool which has a vertical adjustment drive for its focusing optic, but in which the adjustment drive system compensates for the force imposed by the assist gas on the focusing optic, but without requiring the drive itself to overcome that force.

It is a more specific object of the present invention to provide a laser equipped cutting tool having a cutting head with adjustable focusing optic which has provision for counterbalancing the forces of the assist gas on the focusing optic, to prevent the forces imposed by the assist gas on the focusing optic from changing the machine focus.

Considered more broadly, it is an object of the present invention to provide a cutting head for a laser-equipped machine tool in which the cutting head is light in weight for fast moving high performance operation, yet includes an adjustable focusing optic with a comparatively low mass drive which is compensated to balance rather than oppose the forces imposed on the focusing optic by the assist gas.

It is another objective of the present invention to provide a laser-equipped machine tool cutting head which allows the position of the focusing optic to be changed while at the same time reliably maintaining its position after adjustment.

Another object of the invention is to provide a lightweight and easily maneuverable cutting head which avoids the heavy motor and ball screw limitations needed to conventionally adjust the focusing optic against the reaction force of the assist gas imposed on the focusing optic.

It is still another object of the present invention to provide a cutting head wherein the force of the assist gas is opposed by a counterbalance force, and the counterbalance force varies with the pressure of the gas supplied to the cutting nozzle.

According to another specific aspect, it is an object of the present invention to provide a cutting head for a laser-equipped machine tool having a mechanism by which the pressurized assist gas can be quickly purged from the cutting head to thereby facilitate the use of a second gas.

It is a feature of the invention that a cutting head for a laser-equipped machine tool is provided with a vertical adjustment drive for the focusing optic, and the demands on the drive are reduced by providing a pressurized counterbalancing mechanism interposed between the cutting head and the focusing optic, and directed to oppose the forces of the assist gas on the focusing optic.

It is a further feature that the assist gas is used to pressurize the counterbalancing mechanism so that changes in pressure of the assist gas are automatically communicated to the counterbalancing mechanism, and the focusing optic stays balanced irrespective of changes in the pressure of the assist gas.

If is a further feature of the preferred embodiment of the invention that the counterbalancing mechanism has a total area against which the gas pressure operates which approximates the area of the focusing optic on which the assist gas operates, so that an assist gas pressure at a given level will create equal forces on the focusing optic and counterbalancing mechanism.

According to another aspect of the invention, a feature is the provision of a purge system and method in which the type of assist gas can be readily changed. A dump valve is provided which allows the assist gas a low restriction path of escape, and the machine can be cycled to assist the purging of the assist gas.

These and other objectives and features of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
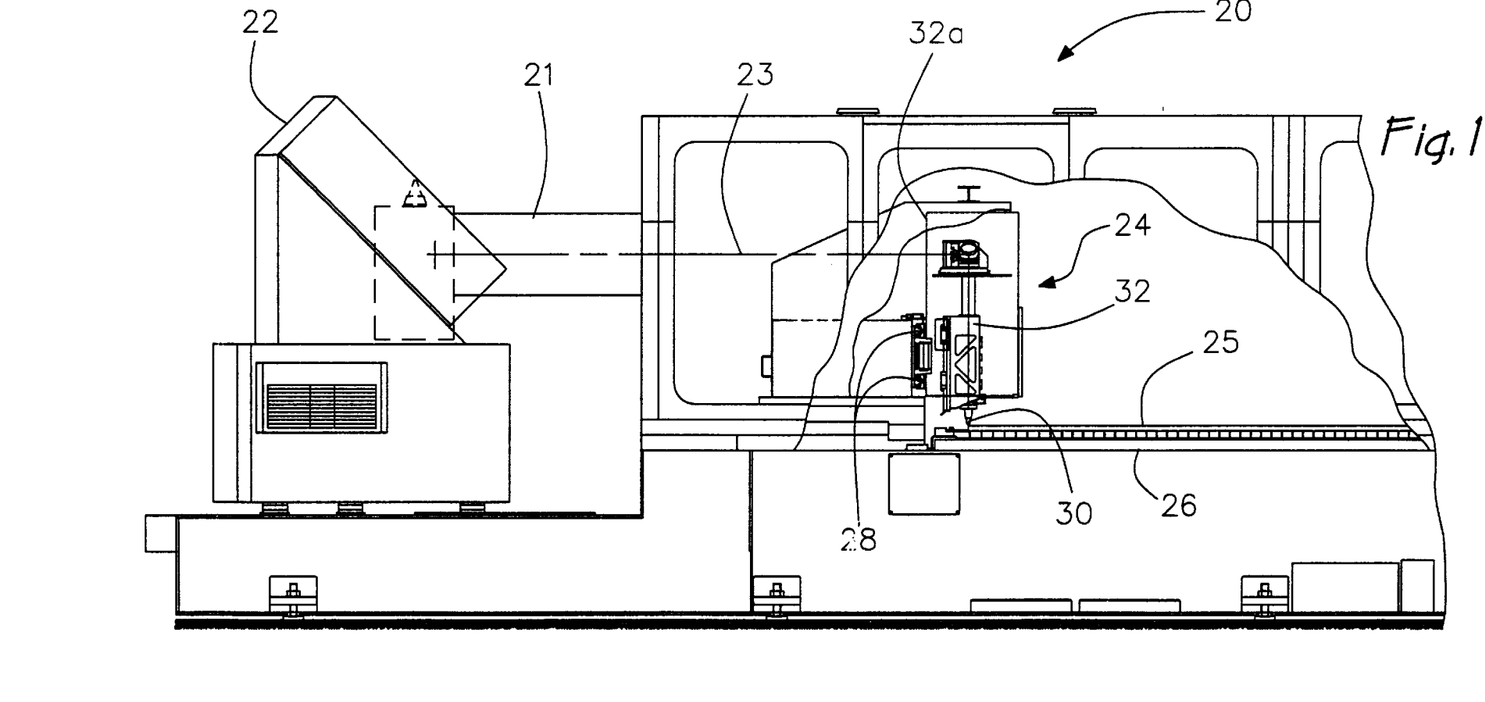
FIG. 1 is a simplified view, in elevation, illustrating the relationships between a laser-equipped machine tool and a cutting head constructed in accordance with the present invention.

Turning now to the drawings, FIG. 1 shows a portion of a laser-equipped cutting machine having a cutting head exemplifying the present invention. The laser-equipped cutting machine 20 includes a laser source 22 (which, for purposes of this description, generically includes both the generator and the resonator). In its preferred embodiment the machine 20 also includes a collimator diagrammatically shown at 21 for controlling the diameter of the beam projected toward the cutting head. The laser source 22 and collimator 21 project a laser beam 23 toward a cutting head assembly 24 which focuses the beam on a workpiece 25 carried on a worktable or pallet 26. The cutting head assembly 24 is mounted on ways for X-axis translation left to right (as seen in FIG. 1), and the bridge or Y-axis carriage 32a includes a set of ways 28 for Y-axis translation of the cutting head across the machine. A computerized numerical control (CNC not shown), drives the positioning mechanisms for the cutting head and the laser control elements to cause the cutting head to traverse the workpiece, cutting the workpiece under the control of the CNC program. The cutting head assembly 24 includes a nozzle 30 through which the focusing optics in the laser head project the laser beam. Also projected through the nozzle 30 are assist cutting gases, often at very high pressures. Accordingly, movement of the cutting head, energization of the laser beam and delivery of an appropriate cutting gas cuts patterns in the workpiece at a high rate of speed under the control of the CNC.

Figure 2:
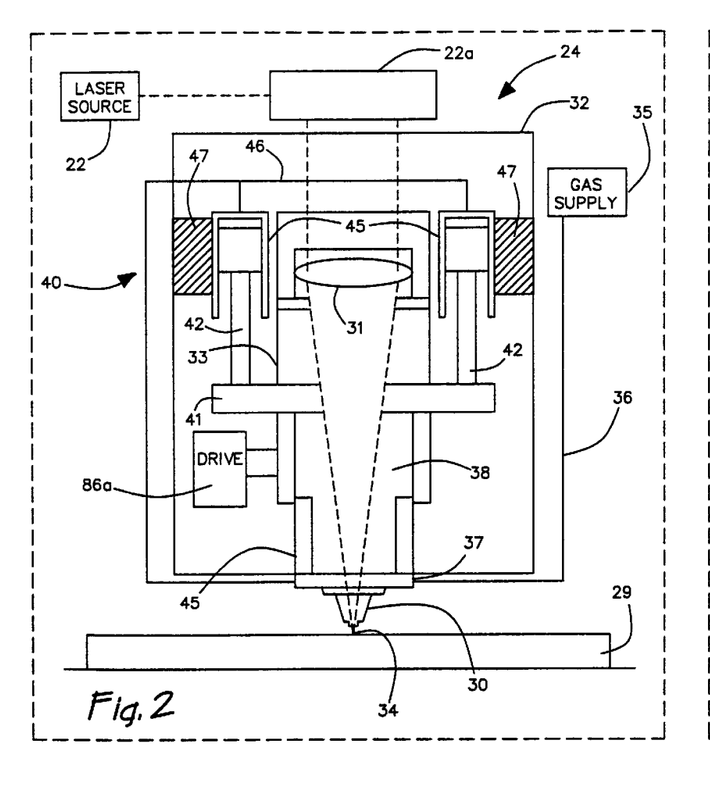
FIGS. 2 and 3 are simplified diagrams illustrating the drive and counterbalance components of a cutting head constructed in accordance with the present invention.
Figure 3:
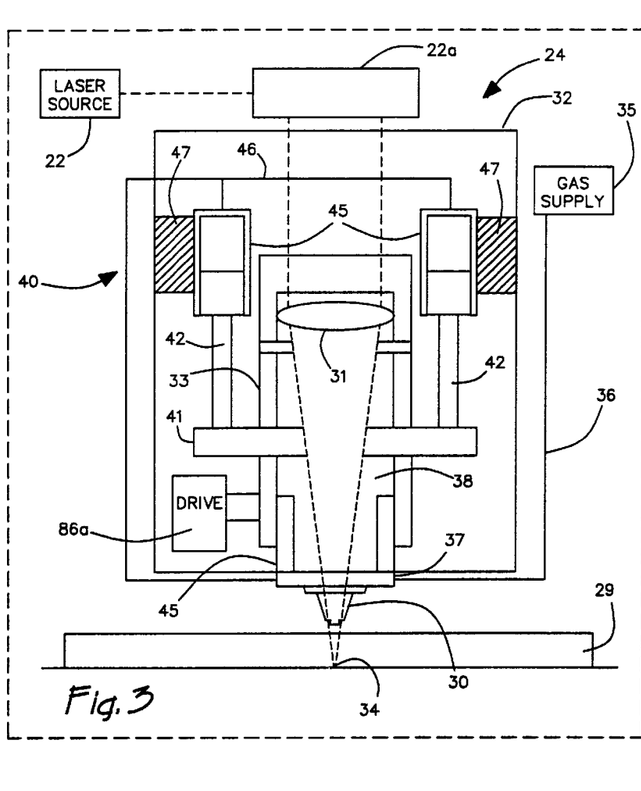

Turning now to FIGS. 2 and 3, the significance of adjusting the focal spot on the workpiece will first be briefly illustrated. For environment, FIGS. 2 and 3 diagrammatically depict the cutting head assembly 24 juxtaposed with respect to the workpiece 29, and the nozzle 30 positioned a slight distance above the workpiece in cutting relationship with it. A drive adjusts the cutting head 32 within the cutting head assembly 24 in the Z-axis direction, i.e. upward and downward, in order to move the nozzle 30 toward or away from the workpiece, such as during traverse of the workhead, and to reposition it in cutting position as illustrated.

A lens carrier 33 located within the cutting head frame 32 is mounted for upward and downward movement within the cutting head so as to adjust to the position of the laser beam focus with respect to the workpiece. The drawings illustrate the laser source 22 operating through a bending mirror 22A which directs a laser beam onto focusing optic 31. As shown, the optic has a focal length which produces a focal point at 34. FIG. 2 illustrates the focal point being positioned at the surface of the workpiece 29. This is the appropriate position for cutting certain types of metals, or for the start of a piercing operation. FIG. 3, in contrast, illustrates the position with the focusing optic moved downwardly with respect to the cutting head. It will be noted that the distance between the end of the nozzle 30 and the surface of the workpiece 29 remains the same. However, the focal point 34 of the beam has now moved through the workpiece to the bottom thereof. This is the appropriate position for completion of a thick material pierce, or for cutting certain materials with high pressure assist gas. The ability to provide for these as well as all other positions will now be apparent.

FIGS. 2 and 3 also illustrate generally the supply of an assist gas to the nozzle 30. A gas supply 35 provides an assist gas through a conduit 36 to an inlet 37 at the nozzle assembly. The gas enters a chamber 38 whereupon it is forced through the nozzle 30 in coaxial relationship with the laser beam. However, within the chamber 38 is also the focusing optic 31 which closes the top of the chamber, and the gas will exert a reaction force against that optic. The force exerted against the optic 32 can be significant. For example, if the assist gas pressure is supplied at 500 psi, and the exposed area of the optic 31 and its holder is 2 ½ inches in diameter, there will be over 2,000 pounds of force applied in an upward direction against the optic 31. A force of this magnitude, if the optic carrier 33 is not adequately restrained in position, would tend move the carrier 33 upwardly, undesirably changing the position of the focal point 34.

In accordance with the invention, counterbalance means indicated generally at 40, and interposed between the cutting head assembly 32 and the optic carrier 33, provides a downward basis force adequate to counterbalance the force exerted on the focusing optic. In the illustrated embodiment, the counterbalance means includes a bolster member 41 to which is connected the movable member 42 of a counterbalance assembly 40, preferably also supplied with assist gas by means of conduit 46. The counterbalance assembly 40 includes a fixed member, shown as cylinders 45, fixed as diagrammatically illustrated at 47 to the frame of the cutting head. The cylinders 45 are configured so that pressure within their pressure chambers provides a downwardly acting force on the lens carrier which is adequate to balance the upward force imposed by the assist gas on the focusing optic. Accordingly, the drive for the focusing optic need only provide sufficient motive force to move the weight of the lens carrier 33, and the substantial force imposed on the optic by the assist gas, is negated by the counterbalancing means 40.

Figure 4:
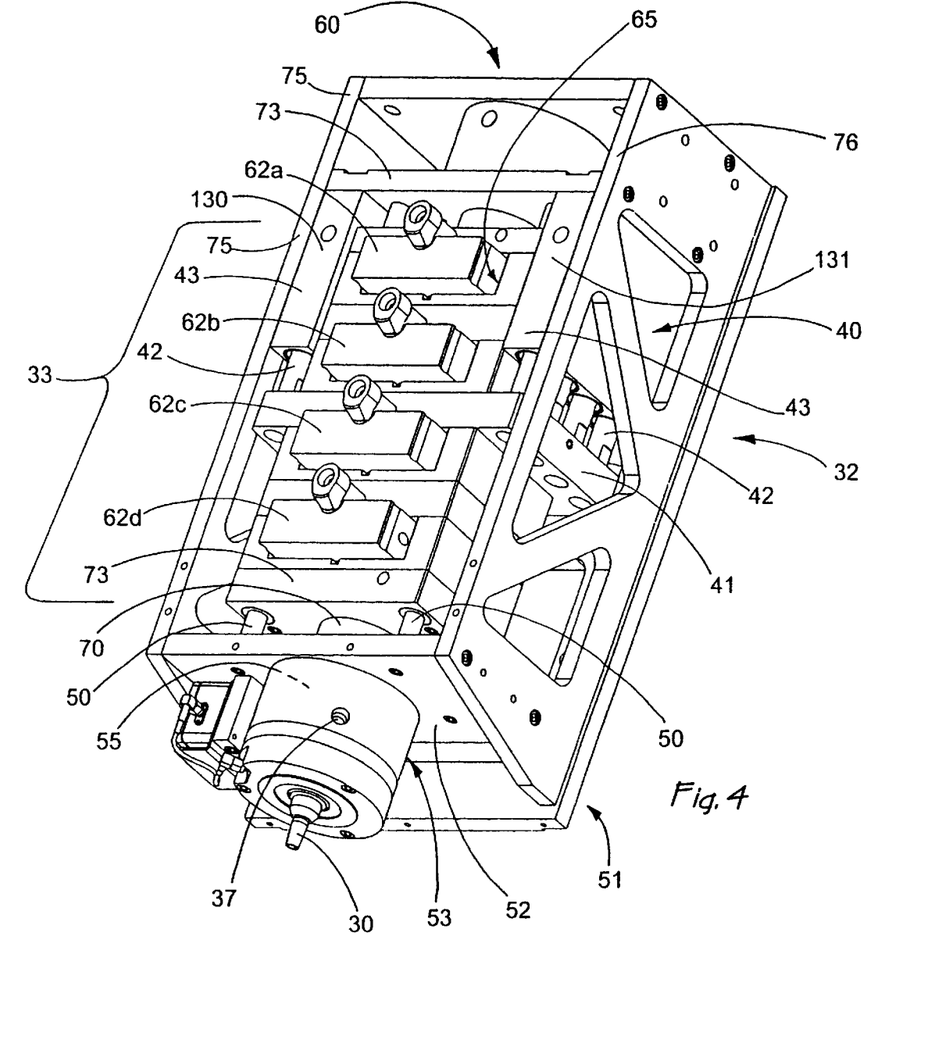
FIG. 4 is a simplified perspective view showing the cutting head mechanism of the machine tool of FIG. 1.

Turning then to the detailed structural diagrams illustrating a currently preferred embodiment of the invention, FIG. 4 shows the major elements of the cutting head 32, which is the machine element configured for upward and downward movement with respect to the workpiece to position the nozzle 30 adjacent the workpiece to perform a cut, and to withdraw the nozzle away from the workpiece, such as during traverse. Thus, when moving from part feature to part feature, the cutting head drive can raise the cutting head assembly 32 so that the nozzle 30 is free of tipped up parts and the like, then bring the cutting head back so that the nozzle 30 is near the workpiece (as shown in FIGS. 1–3) to perform the next cut. The sensing elements for operating with the cutting head vertical drive control to control the size of the cutting gap between the nozzle end and the workpiece are not shown, and form no part of the present invention. Any of the commonly used types of sensing systems can be used.

In the illustration of FIG. 4, the lens assembly 33 is mounted within the cutting head assembly 32 and is mounted on a set of four guide rods 50 to allow the lens assembly 33 to be raised or lowered within the cutting head.

A drive mechanism, to be described later allows the numerical control to adjust the position of the lens assembly 33 within the cutting head 32, independently of the position of the cutting head 32 which is adjusted by its drive.

Examining the structure in greater detail, it will be seen that the illustrated cutting head 32 includes a frame 51 fabricated from a number of parts which need not be described in detail, but which provides a rigid box like structure housing the elements which deliver the laser beam and cutting assist gas through the nozzle 30 to the workpiece (not shown). A bottom plate 52 has affixed therein a nozzle assembly 53 having a gas inlet 37 through which the assist gas is supplied. An internal chamber 55 is sealed to retain the assist gas, and also to provide shielding for the laser beam. The laser beam is input through an optical inlet generally indicated at 60 through a focusing optic within the lens carrier 33 to be projected through the center of the nozzle 30. The illustrated embodiment makes provision for interchange of different focal length optics, so as to increase the versatility of the associated machine tool. To that end, provision is made for accepting four optical elements of different focal length by easily replaceable drawers or slides. As shown the optical carrier 33 includes four lens drawers 62a–d, each adapted to carry a different focusing lens. The longest focal length lens is inserted in drawer 62a and that with the shortest focal length in drawer 62d. Only one lens will be used at a given time, with the other three lens drawers being filled with blank cartridges adapted to seal the laser beam path, but otherwise to have no effect on the laser beam. Thus, when a lens is used which requires it to be inserted into the lens carrier 33 in the position associated with cartridge 62b, the cartridges 62a, 62c and 62d will be blank, and the lens will be within the cartridge 62b. Manually operable locks are provided to maintain each of the cartridges 62 within their associated slot 65. When cartridges are within each of the slots and the locks properly secured, the lens housing 33 presents a gas tight arrangement from which the assist gas will not escape. The lens carrier 33 is coupled in telescoping fashion at 70 to the inlet 55 of the nozzle assembly, so that the lens carrier can move up and down with respect to the nozzle. For that purpose the lens carrier is guided on guide rods 50 which ride in bearings 72 (see FIG. 10) mounted in the lens carrier 33.

In practicing the invention, the cutting head of FIG. 4 is provided with a counterbalance means generally indicated at 40. As described briefly above, the counterbalance includes a plurality of gas operated cylinders 43 interposed between the cutting head carriage 32 and the optic housing 33. In the illustrated embodiment, the cylinder bodies are affixed to the upper bolster plate 73 of the cutting head 32. Each of the cylinders 43 has an operating rod 42, and all of the operating rods are affixed to a central bolster 41 which in turn is affixed securely to the lens carrier 33. While it is convenient to mount the cylinders in that manner, in other arrangements the cylinder bodies could be affixed to the lens carrier and the operating rods to the carriage assembly. The invention is intended to encompass both alternatives.

The lens carrier is provided with a power drive, to be described below, which serves to drive it upwardly or downwardly along the guide rods 50. When the lens carriers is driven upwardly, the pistons are forced further within the cylinders 43, and when it is driven downwardly, the pistons are further extended. In practicing the invention, the same assist gas which is supplied to the nozzle 30 by means of inlet port 37 is also supplied to the pressure inlets of each of the cylinders 43. The total piston area of the cylinder arrangement 43 is established to approximate the total area of the optic against which the assist gas bears, so that when the assist gas is supplied to both the cutting head and the counterbalance assembly, the forces which it generates at any given pressure will counterbalance. The drive for the counterbalance assembly therefore only needs to have sufficient capacity to move the elements of the lens carrier against their own weight, and does not need to be sized to move against the full force imposed by the assist gas against the lens.

Figure 5:
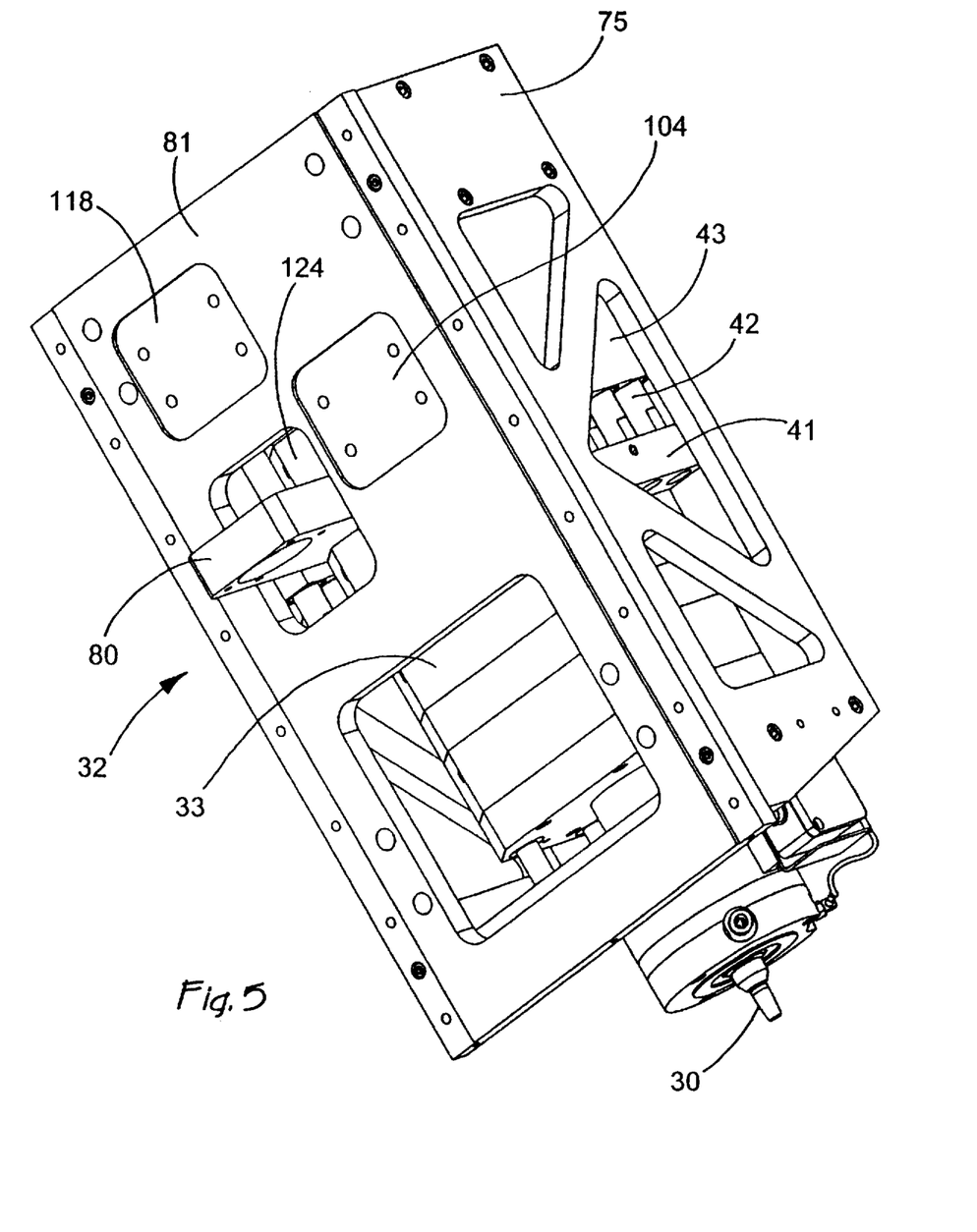
FIG. 5 is a perspective view showing the rear of the cutting head shown in FIG. 4.

Turning briefly to FIG. 5, there is shown the enclosed back of the optic carrier 33, and there is also shown a driving flange 80 projecting through the rear wall 81 of the housing for engaging drive elements now to be described.

Before describing the drive in detail, however, it will be mentioned that various implementations of drive mechanism can be utilized for raising and lowering both the cutting head and the optics within the cutting head. The presently preferred form utilizes servo motors driving ball screws, referred to herein more generically as translation screws. However, it will also be apparent that the drives for the cutting head and for the optical carrier can be accomplished by other expedients, such fluid operated cylinders of the pneumatic or hydraulic type, linear motors or stepper motors, for example. The drive element 86a shown in FIG. 2 is illustrated only diagrammatically, so as to represent all such drive forms. As will become apparent, the preferred embodiment is shown as including a servo motor and translation screw. It will be apparent to those skilled in the art that the translation screw can be replaced with a fluid operated cylinder controlled in feedback fashion to accomplish the drive for either or both of the optic carrier and the cutting head. All of such prime movers are within the spirit and scope of the invention, which is directed to the counterbalancing means which reduces the load carrying demands on whatever form of drive mechanism is selected.

There are two drives associated with the cutting head of the illustrated embodiment, one for vertically positioning the cutting head itself, and one for vertically positioning the optic carrier. The drives are best illustrated in FIGS. 6–9, when taken in conjunction with FIGS. 4 and 5 for structural reference and FIGS. 2 and 3 for schematic functional reference.

Figure 6:
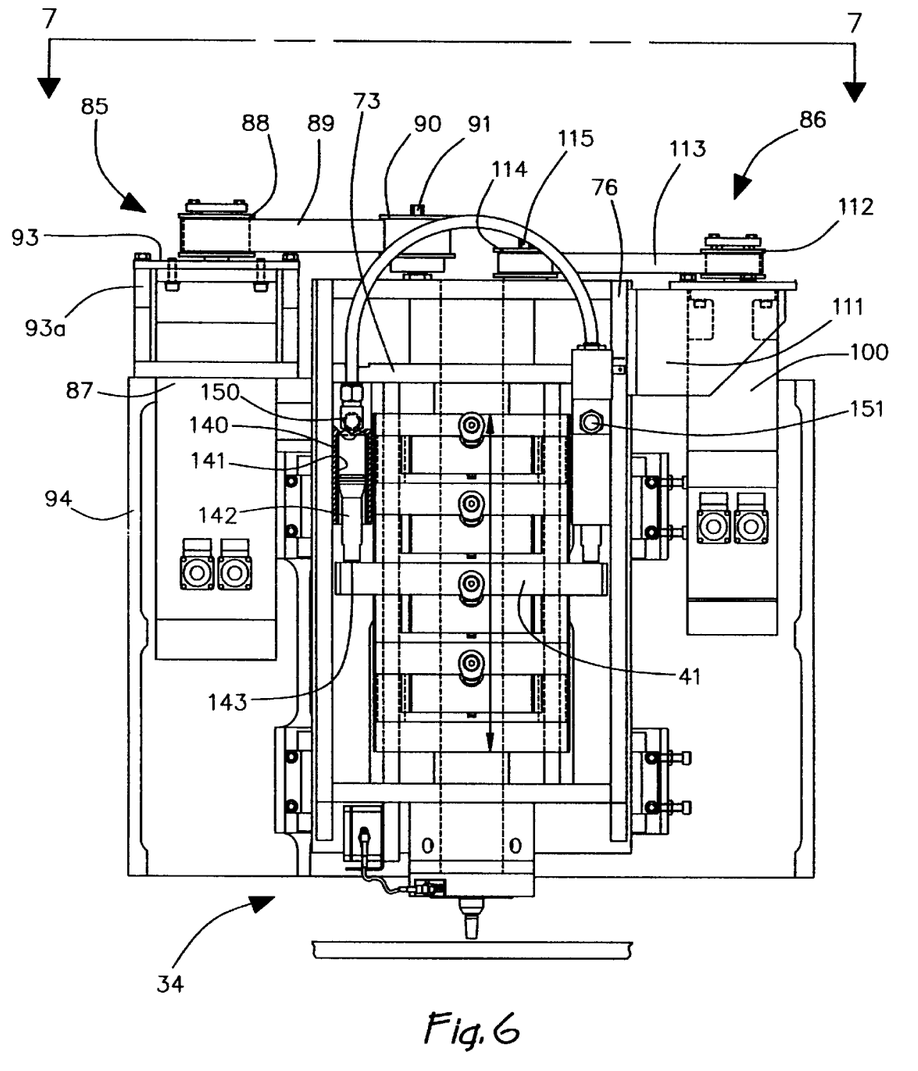
FIG. 6 is an elevation view of the cutting head of the machine of FIG. 1 showing the drive components for raising and lowering the head and for raising and lowering the focusing optics.
Figure 7:
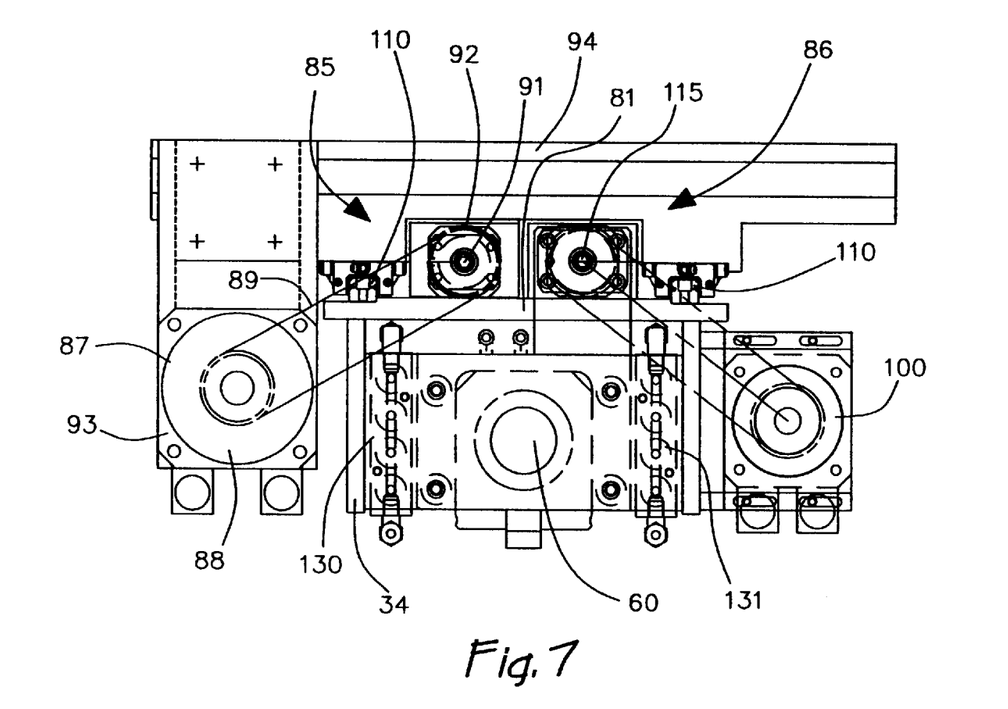
FIG. 7 is a plan view of the head taken generally along the line 7–7 of FIG. 6.
Figure 8:
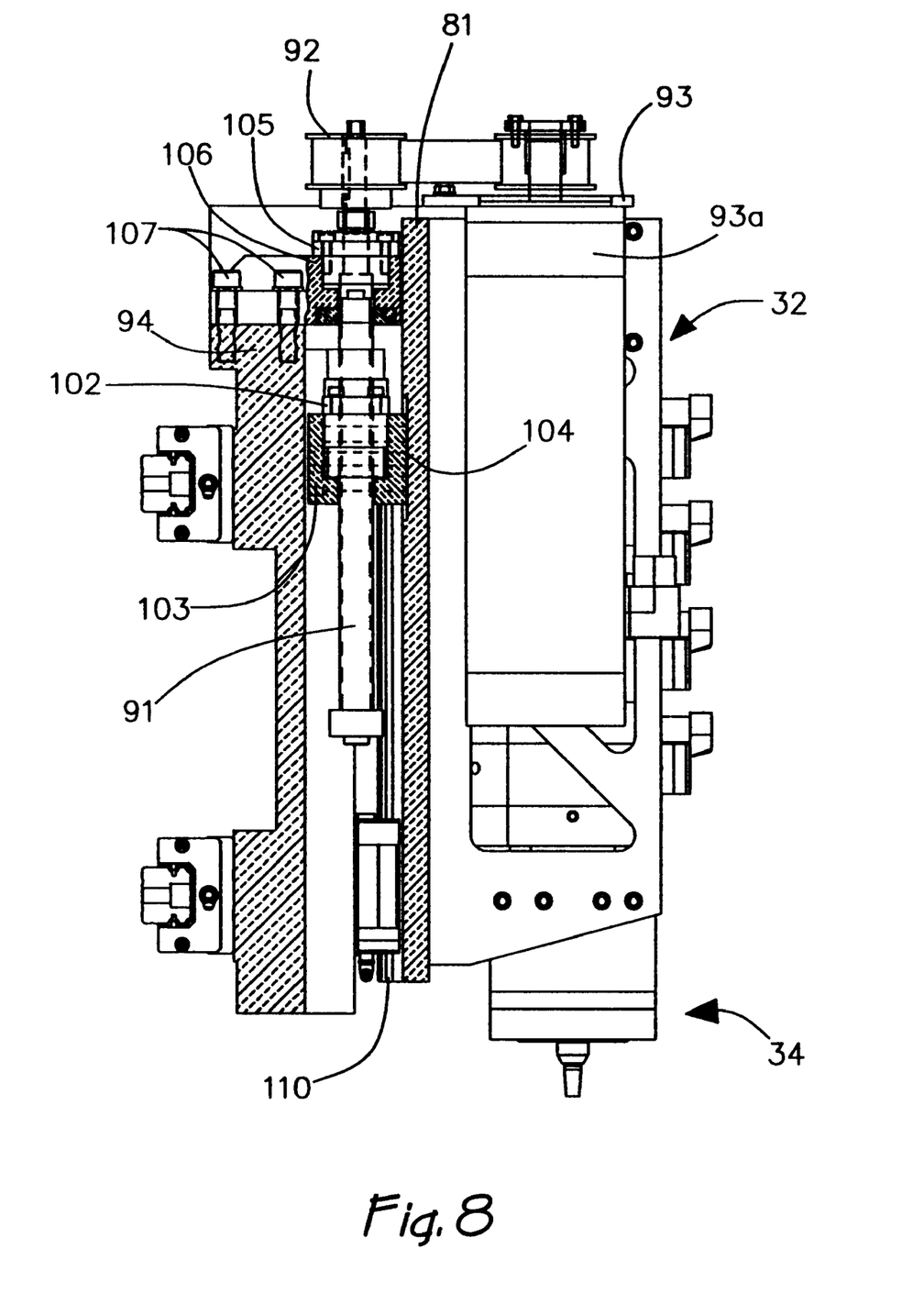
FIG. 8 is a left side end elevation of the cutting head of FIG. 6, partly cut away, showing the drive components for raising and lowering the cutting head.
Figure 9:
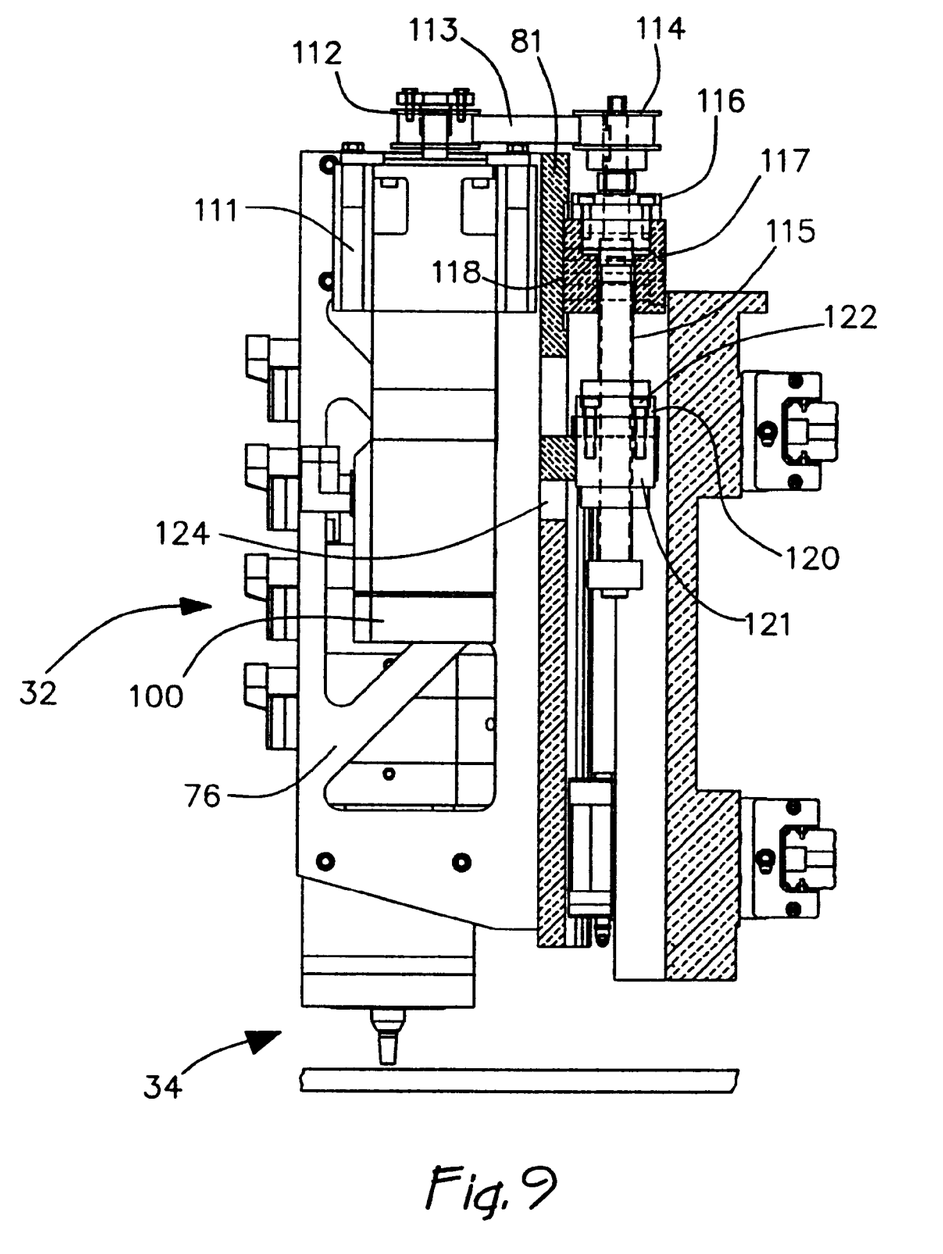
FIG. 9 is a right side end elevation of the cutting head of FIG. 6, partly cut away, illustrating the drive mechanism for the lens carrier.

Focusing particularly on FIGS. 6–9, it will be seen that there are two prime movers associated with the cutting head 32, one comprising the cutting head positioning drive generally indicated at 85, and the second being a focusing optic positioning drive generally indicated at 86. In the illustrated embodiment, both such drives utilize servo motors for prime movers. Thus a comparatively larger servo motor 87 drives a timing belt pulley 88 and by means of a timing belt 89 a driven pulley 90 for rotating a translation screw 91 adapted to translate the cutting head up and down with respect to the frame on which it is mounted. As best shown in FIG. 7, the translation screw 91 is located between the back wall 81 of the cutting head 32, and the front of carriage 94. The servo motor 87 is attached by means of brackets 93, 93a to the workhead carriage frame 94. Similarly, the translation screw 91 is fixed in place with respect to the carriage frame 94 in such a way that rotating the ball screw will raise or lower the cutting head 32 with respect to the carriage 94. Referring to FIG. 8 and the translation screw 91, the nut 102 on the translation screw 91 is attached to housing 103 which in turn is affixed by bolts, not shown, on a pad 104 to the backplate 81 of the cutting head 32. The upper end of the translation screw 91 is constrained by bearing 105 which is mounted in housing 106 which in turn is affixed by bolts 107 to the carriage 94. Thus the translation screw is axially fixed, and rotation thereof will move the nut 102 upwards or downwards. Since the nut is attached to the backplate of the cutting head, rotation of the drive will cause the cutting head to be raised or lowered. It is seen from FIG. 7 that ways 110 are interposed between the carriage 94 and the cutting head 32 so that the cutting head is smoothly guided up and down along the carriage as the servo motor 87 acts through the translation drive to reposition it.

As seen in FIG. 6, the drive mechanism 86 for the optic carrier is mounted on the structure of the cutting head itself, and moves the translatable lens carrier up and down within the cutting head. Thus, a servo motor 100 is attached by means of a bracket 111 to the side wall 76 of the cutting head 32. The servo motor has a drive pulley 112 acting through a timing belt 113 to rotate a driven pulley 114 which in turn drives a translation screw 115 (see also FIG. 9). Like the carriage drive translation screw, the upper end of the translation screw 115 is fixed by a bearing 116 in a bracket 117. In this case the bracket is attached by bolts, not shown, to a machined pad 118 on the backplate 81 of the cutting head. A translation nut 120 rides on the translation screw 115. The nut is affixed to a housing 121 as by bolts 122. The housing in turn is secured to the apertured flange 80 (FIG. 5). Accordingly, rotation of the drive causes the ball nut to translate which carries the flange 80 upwardly or downwardly, adjusting the position of the focusing optic within the cutting head. It will be seen that a window 124 is provided in the backplate 81 of the carriage 32 to allow an adequate degree of translation of the focusing optic.

To summarize the controllable movements of the cutting head, the cutting head drive 85 includes a servo motor 87 which drives the translation screw 91 mounted to translate the cutting head 32 in the Z-axis to control the position of the nozzle with respect to the workpiece. A lens carrier drive 86 including a servo motor 100 and a translation screw 115 translate the lens carrier 33 along the Z-axis independently of movement of the nozzle on that axis.

As noted previously, assist gas is coupled at 37 to the nozzle structure, and as illustrated in FIGS. 2 and 3, the assist gas within the chamber 38 creates a reaction force against the optical element 31. If it were desired to reposition the focal point 34 during a cut, the drive would have to oppose that reaction force, unless steps are taken as taught herein.

In accordance with the invention, the assist gas which is coupled to the nozzle is also provided to the counterbalancing mechanism 40 to create a counterbalancing force which is substantially equal to the reaction force. It is preferred that the counterbalancing means be made up of a number of gas operated cylinders, with their positions balanced around the cutting head so that the counterbalancing force is balanced with respect to the reaction force. In the illustrated embodiment the reaction force is applied centrally on the focus optic. As best seen in FIGS. 4 and 7 the cylinders form two banks 130 and 131 down the respective side, and as illustrated, each bank is made up of four individual cylinders formed in a single block.

The cylinders are configured so that the pistons therein have areas which when combined approximate the area of the focusing optic on which the reaction force bears. Thus, with the same pressure being applied to the nozzle chamber and to the cylinders, and with the areas of each being about the same, the same force will be generated. In the case of in the cutting nozzle, the force is upward on the optic carrier, and in the case of the counterbalancing mechanism, it is downward on the optic carrier. Furthermore, since the reaction force is centered and the counterbalancing force is systemically distributed about the center, the counterbalancing force will balance the reaction force without any tendency to cant, distort or bind the apparatus. With the forces thus balanced, the relatively smaller servo motor and drive 86 is capable of translating the focusing optic to adjust the focal spot with respect to the workpiece, even when 500 psi or more of assist gas pressure are applied to the nozzle.

With respect to details, FIG. 6 shows one of the cylinders in section, to show elements of the internal construction thereof. It will be seen that the cylinder 140 includes a cylinder liner 141 in which rides a piston 142. The piston has its lower end 143 fixed to the bolster 41, and the cylinder bodies are fixed to the upper bolster plate 73. Machined passageways in the cylinder bodies 130 and 131 couple all of the cylinders in a bank to each other.

Figure 10:
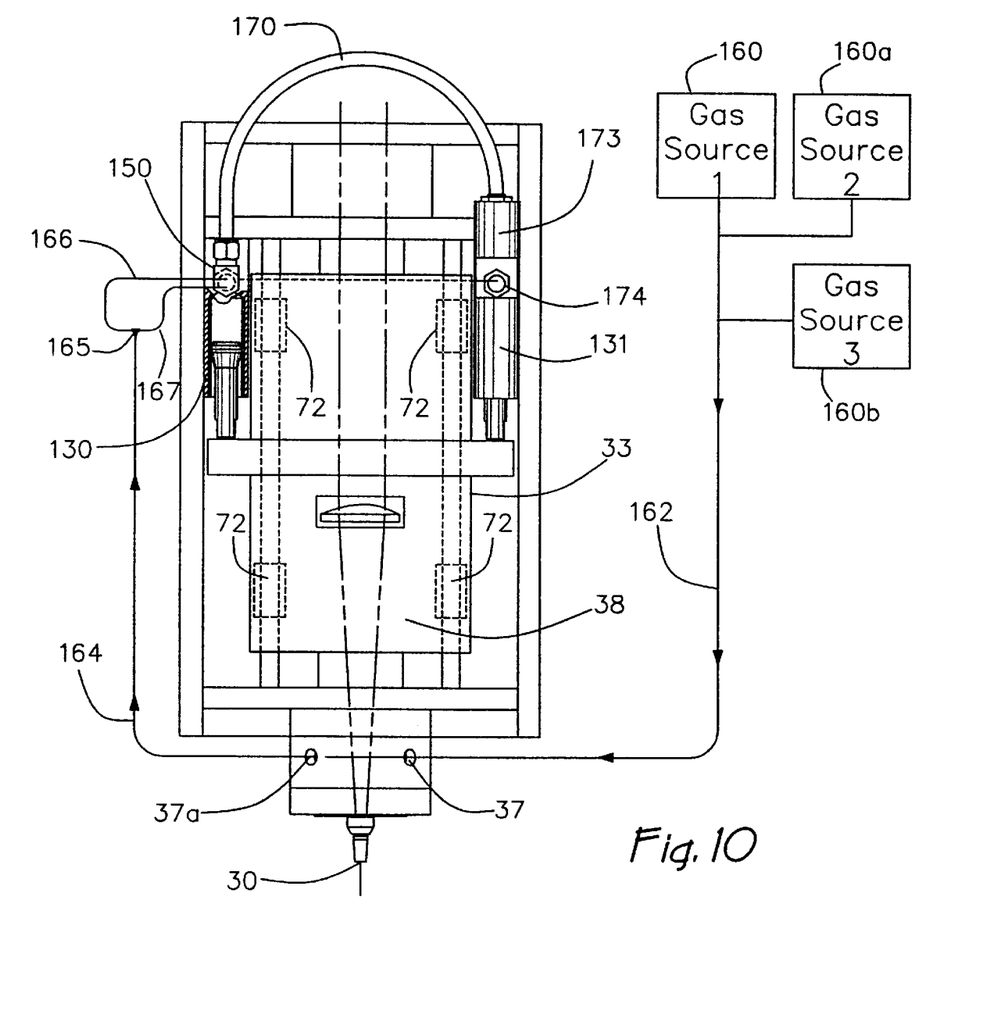
FIG. 10 is a diagram similar to FIG. 2 but showing the gas supply and purge lines for both the assist gas to the cutting head and the counterbalance gas to the counterbalancing cylinder.
Figure 11:
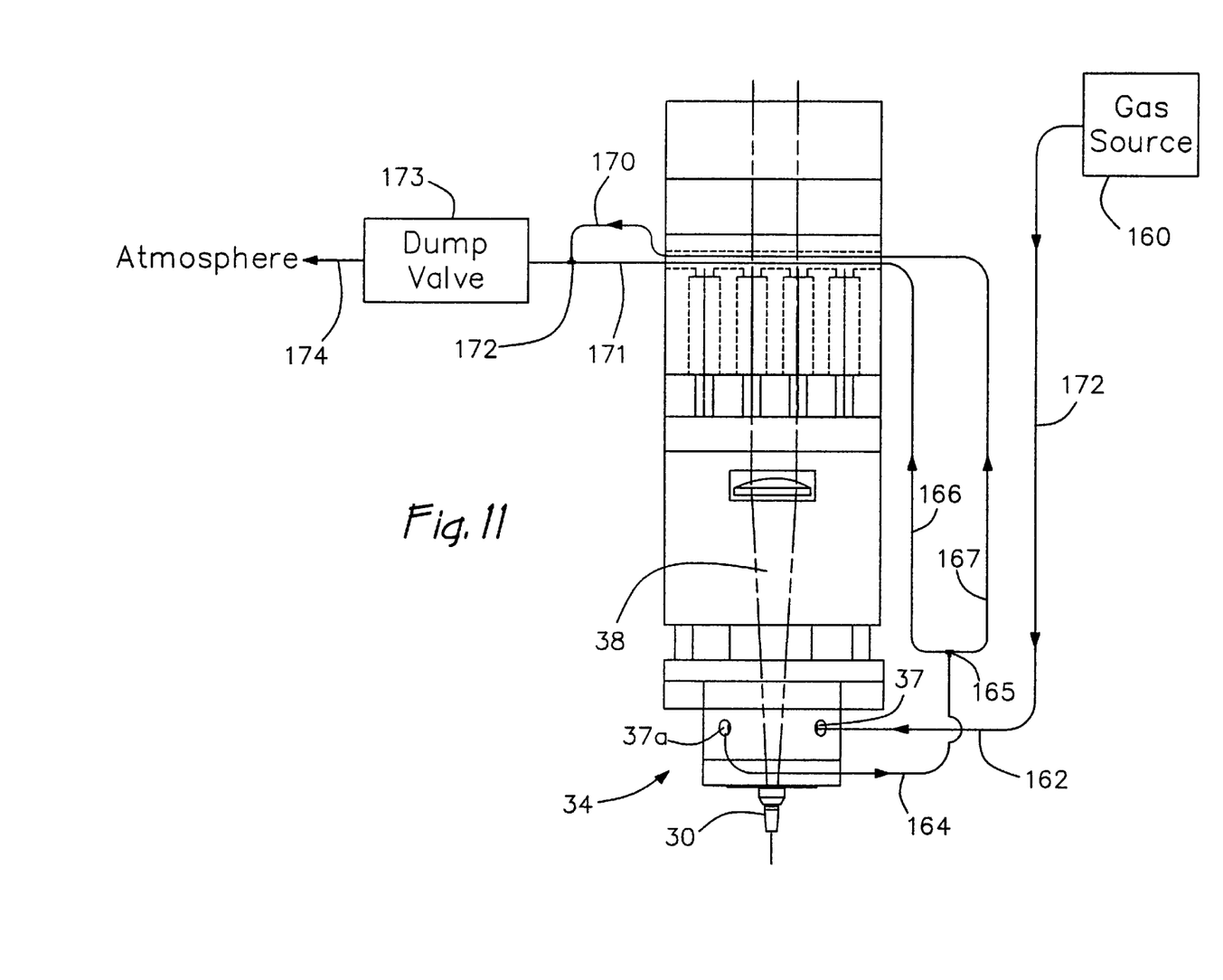
FIG. 11 is a diagram similar to FIG. 10 but taken from one side of the cutting head.

The manner in which the assist gas is coupled to the cutting head and to the counterbalance mechanism is best illustrated in FIGS. 10 and 11. Those figures diagrammatically show the front and end views of the cutting head 32, with the primary purpose being the illustration of the manner in which the assist gas is routed. It will be seen that there is a gas source 160 which is coupled directly to a port 37 above the nozzle 30 by means of a tubing section 162. A similar port 37a above the nozzle 30 has a tubing section 164 which is directed toward the cylinder body 130, 131 The tubing section 164 is split, such as by a y-connector at 165 so that individual lines 166, 167 are routed to the respective cylinder bodies, on the backside of both blocks as they are shown in FIG. 10 (to the right in FIG. 11). The front side of cylinder body 130 is connected by way of 900 fitting 150 and tube section 170 to a T-connector 171. The T-connector is also connected to the front side of cylinder body 131 and to the back side of dump valve 173. The dump valve 173 is intended to provide a low resistance release path for assist gas in the system. The exhaust port of dump valve 173 is fitted with a silencer 174 and exhausts to atmosphere.

As noted earlier, there are number of circumstances where it is desired to change from one type of assist gas to another, for example, from oxygen to nitrogen. When that circumstance arises, it is important to purge the old assist gas from the nozzle 30, so that the old assist gas, now of incorrect type, is not projected into the laser beam or onto the workpiece to detrimentally effect the cut then being made.

In accordance with the invention, the counterbalancing system and the connection thereof just described assist in purging the assist gas from the system and particularly from the chamber 38 which directly supplies the nozzle 30.

Thus, when it is desired to change the type of assist gas, first of all the gas supply 160 is shut off. Simultaneously, the dump valve 173 is opened and the new gas source 160a turned on. Some of the residual gas will escape through nozzle 30, but since nozzle 30 is quite small, the quantity escaping therethrough will not be great. However, with the dump valve open, a relatively restriction free path to atmosphere exists at what would otherwise have been a dead end in the gas system. Thus, the relatively higher pressure within chamber 38 from the residual gas can escape to atmosphere directly through the cylinder bodies 130, 131, with no substantial restrictions between the chamber 38 through the cylinder bodies 130, 131 to the dump valve 173.

Whatever residual gas remains in the system is eliminated by cycling of the lens carrier. More particularly, as the lens carrier is driven in the downward direction, the size of chamber 38 is reduced, forcing the assist gas in that chamber through the conduits 164, 166 and 167 to the cylinder bodies 130, 131, and thence through the dump valve into the atmosphere. Similarly, raising the optic carriage serves to purge the assist gas from the counterbalancing cylinders. A second cycle of lowering the optical carrier will again purge from the chamber 38 what little residual gas remains. Utilizing the tubing connections described generally above, with the free flow to atmosphere provided at the manifold, and the nozzle chamber 38 connected directly to that manifold, purging of the system to change gas is much more quick and effective.

In view of the foregoing, it will now be apparent that what has been primarily provided is a counterbalance mechanism for a lens carrier in a cutting head of a laser-equipped machine tool. The lens carrier is maintained in a fairly simple configuration with no interfering structure interposed between the focusing optic and the nozzle. But that leaves the focusing optic exposed to the pressure of the assist gas. To prevent the reaction force of the assist gas on the optic from moving the focus point, and to significantly reduce the demands on the lens carrier drive, a simple and effective counterbalance mechanism is also built into the cutting head. The counterbalance mechanism is interposed between the cutting head and the lens carrier. Gas operated pistons in the counterbalance mechanism are arranged so that the force exerted by the pistons is downward, in opposition to the reaction force on the optic. The same assist gas which supplies the nozzle of the cutting head is connected to supply the counterbalance mechanism. The effective operating area of the counterbalance mechanism is selected to be about the same as the effective area against which the reaction force is exerted. As a result, the forces, although substantial, balance and it is possible to translate the lens carrier with a reasonably light and precise drive system which would, on its own, simply be incapable of resisting the reaction forces.

What is claimed is:

1. A cutting head for a laser-equipped machine tool which utilizes pressurized assist gas, the cutting head comprising in combination:

a frame carrying a cutting nozzle;

an optic carrier mounted for translation on the frame;

a drive for controllably translating the optic carrier toward or away from the nozzle;

a chamber including the nozzle and at least a part of the optic carrier for receiving pressurized assist gas, the gas asserting a reaction force against the optic carrier in a direction away from the nozzle;

a gas operated counterbalance assembly including a part fixed to the frame and an operating part attached to the optic carrier, the counterbalance assembly being connected to the assist gas so that it generates a force in opposition to the reaction force; and wherein the counterbalance assembly includes at least two groups of cylinders, each group including at least two cylinders, each cylinder having a body, a piston and an operating rod, the groups of cylinders being interposed between the frame and the optic carrier and being distributed to balance the reaction force, and the assist gas being supplied to the counterbalance mechanism for supplying a counterbalancing force which varies with the pressure of the assist gas.

2. The combination of claim 1 wherein the total working piston area of the pistons approximates the area of the optic carrier on which the reaction force is exerted, and the gas connection supplying the assist gas at the same pressure to both the chamber and the counterbalance assembly.

3. The combination of claim 2 wherein a plurality of pressurized gas cylinders laterally flank the optic carrier, the gas cylinders being in balanced fluid communication with the assist gas passing through said chamber.

4. The combination of claim 1 wherein the optic carrier has a plurality of bays for receipt of different focal length optics.

5. The combination of claim 1 wherein the drive has a capacity which is exceeded by the magnitude of the reaction force without counterbalance in at least some cutting conditions, and the drive has a capacity which is less than the given magnitude.

6. A cutting head for a laser-equipped machine tool adapted to utilize pressurized assist gas in making laser cuts in a workpiece, the cutting head comprising in combination:

a frame carrying a cutting nozzle;

an optic carrier mounted for translation in the frame;

a drive for controllably translating the optic carrier toward or away from the nozzle;

a chamber for supplying assist gas to the nozzle, the optic carrier closing a portion of said chamber such that the assist gas asserts a reaction force against the optic carrier;

two banks of cylinders, one disposed on each side of the chamber, each bank including a plurality of cylinders each having a piston connected to an operating rod riding within a bore in a body;

the cylinder banks being affixed to the carriage and the operating rods to the optic carrier in such a way that pressure applied to the pistons creates a force on the optic carrier in opposition to the reaction force; and a connection for supplying the assist gas to the cylinders for creating a force on the piston.

7. The combination of claim 6 wherein the drive has a capacity which is exceeded by the magnitude of the reaction force without counterbalance in at least some cutting conditions, and the drive has a capacity which is less than the given magnitude.

8. The combination of claim 7 wherein the cylinders have a combined piston area which approximates the area of the optic carrier against which the assist gas bears.

9. The combination of claim 6 wherein the connection for supplying the assist gas to the cylinders comprises a fluid connection between the cylinder banks and the chamber supplying assist gas to the nozzle.

10. The combination of claim 9 further including a dump valve to controllably open the connection which supplies assist gas to the cylinders to allow purging of both the cylinders and the chamber.

11. The combination of claim 6 wherein the optic carrier has a plurality of bays for receiving optic assemblies of different focal length.

12. The combination of claim 6 wherein the banks of cylinders comprise an even number of cylinders disposed in two lines on opposite sides of the optic carrier.

13. In a laser-equipped cutting head for use with an assist gas, the combination comprising:

a focusing optic and a nozzle forming a passage for the laser beam and a chamber for the assist gas;

the focusing optic being linearly translatable in the cutting head;

a gas operated counterbalance assembly interposed between the cutting head and the focusing optic and having a port for receiving the assist gas;

the assist gas being connected to both the chamber nozzle and the counterbalance assembly in series so that the counterbalance produces a counterbalance force opposing a reaction force imposed on the focusing optic by the assist gas;

a dump valve connected to of the counterbalance cylinders and operable to open during purge of the assist gas; and whereby the series connection between the nozzle chamber and the counterbalance assemblies serve to purge the assist gas from both when the dump valve is opened.

14. A method of operating a laser-equipped machine tool to use different assist gases in sequence, the method comprising the steps of:

supplying a first assist gas to the nozzle and to a counterbalance assembly connected in series therewith;

when it is desired to change assist gases, turning off the supply of the first assist gas, opening a dump valve to exhaust both the nozzle chamber and the counterbalance assembly;

applying a second source of assist gas;

cycling the focusing optic between end points with the dump valve open and gas supply off in order to purge the first assist gas from the system; and closing the dump valve.

15. The method claim 14 wherein the dump valve is located in series after the nozzle and counterbalance assembly to provide a low restriction path in the series connection farthest from the gas supply.

* * * * *